H. K. HOLSMAN.
DRIVING MECHANISM FOR AUTOMOBILES.
APPLICATION FILED FEB. 9, 1909.

998,002.

Patented July 18, 1911.

H. K. HOLSMAN.
DRIVING MECHANISM FOR AUTOMOBILES.
APPLICATION FILED FEB. 9, 1909.

998,002.

Patented July 18, 1911.

Witnesses:

Inventor:

H. K. HOLSMAN.
DRIVING MECHANISM FOR AUTOMOBILES.
APPLICATION FILED FEB. 9, 1909.

998,002.

Patented July 18, 1911.

H. K. HOLSMAN.
DRIVING MECHANISM FOR AUTOMOBILES.
APPLICATION FILED FEB. 9, 1909.

998,002.

Patented July 18, 1911.

UNITED STATES PATENT OFFICE.

HENRY K. HOLSMAN, OF CHICAGO, ILLINOIS, ASSIGNOR TO INDEPENDENT HARVESTER COMPANY, A CORPORATION.

DRIVING MECHANISM FOR AUTOMOBILES.

998,002.  Specification of Letters Patent.  Patented July 18, 1911.

Application filed February 9, 1909. Serial No. 476,915.

*To all whom it may concern:*

Be it known that I, HENRY K. HOLSMAN, a citizen of the United States, and a resident of Chicago, in the county of Cook and State of Illinois, have invented certain new and useful Improvements in Driving Mechanism for Automobiles, &c., of which the following is a full, clear, and exact specification.

My invention is concerned with a novel driving mechanism designed primarily for automobiles, and while it may be employed elsewhere, it is adapted to be employed in connection with automobiles of the type shown in my Patent No. 697,720, granted April 15, 1902, in which the motor is stationary and a swinging countershaft is employed, but which is more especially adapted for use in connection with automobiles of the type shown in my application No. 352,848, filed January 18, 1907, in which the motor itself is moved. In my present invention, I employ sprocket chains which have frictional engagement only with the sheaves on the traction wheels, and which have frictional engagement only with the driving sheaves on high speed, but I provide the driving sheaves with sprocket teeth with which the chain engages to drive at low speed.

It is also concerned with a novel support and connections for the swinging motor, which may be employed whether the driving mechanism of the present application or that of my prior application No. 352,848, above referred to, is employed.

It is also concerned with a novel device by which the driving rope or chain may be moved entirely out of engagement with the driving sheave when the machine is at rest or being driven backward.

It is also concerned with various other novel elements and combinations of elements adapted for use either on automobiles generally or with this type of automobile particularly, all of which will be described in detail in the body of the specification and particularly pointed out in the claims.

To illustrate my invention, I annex hereto six sheets of drawings in which the same reference characters are used to designate identical parts in all the figures, of which,—

Figure 2:
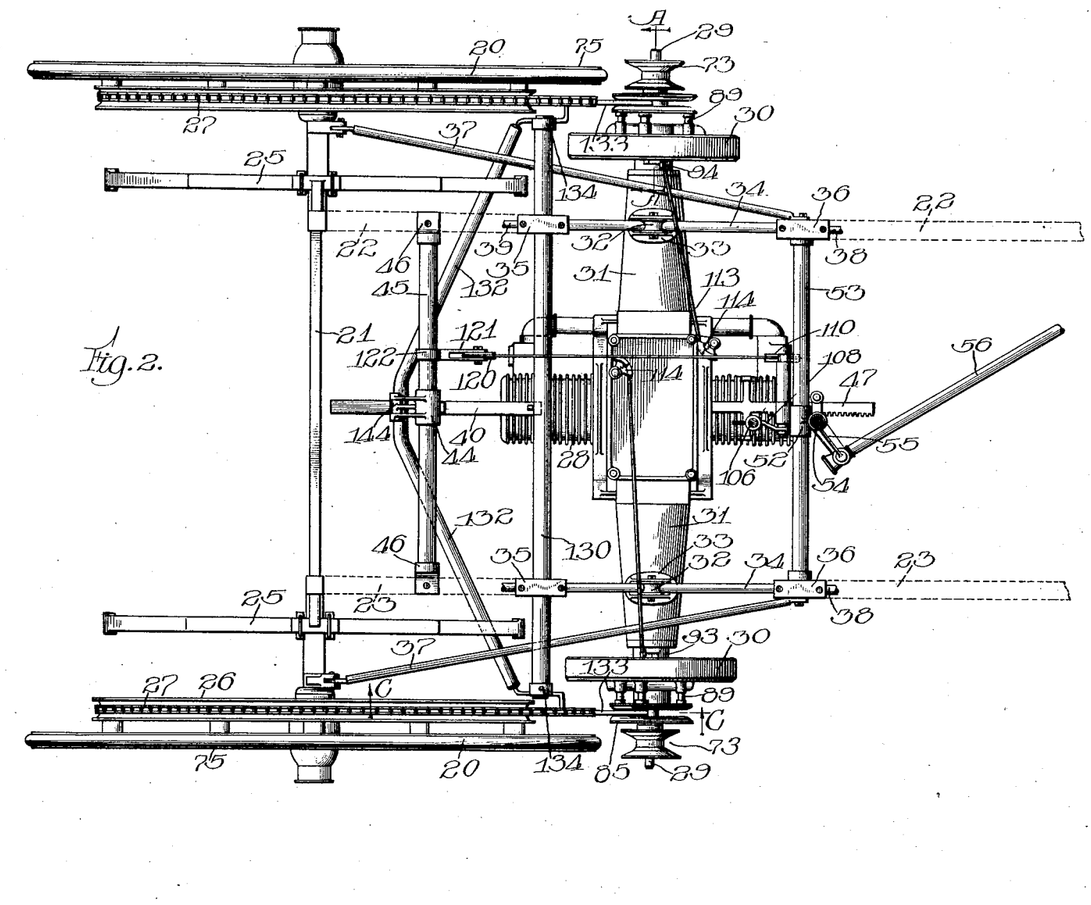
Fig. 2 is a top plan view of the same, with the body of the vehicle removed.

In carrying out my invention, I may employ an automobile running-gear comprising a pair of rear traction wheels 20 mounted on a rear axle 21, and connected by the side bars of the frame, indicated in dotted lines at 22 and 23 of Fig. 2, with the front steering wheels, which are not shown. The side bars of course support the body 24 of the vehicle, the rear portion of which rests on the springs 25, which of course are carried by the axle bar 21. The traction wheels are provided with a pair of large sheaves 26 secured to the spokes concentrically with the rim, these sheaves having the proper cross section so that they will maintain a firm frictional engagement with the endless flexible connection 27 between the traction wheels and the driving shaft, which connection preferably takes the form of a sprocket chain adapted for either a frictional or sprocket drive, such a chain being shown in my application No. 446,231, filed July 31, 1908.

Figures 5, 6, 7:
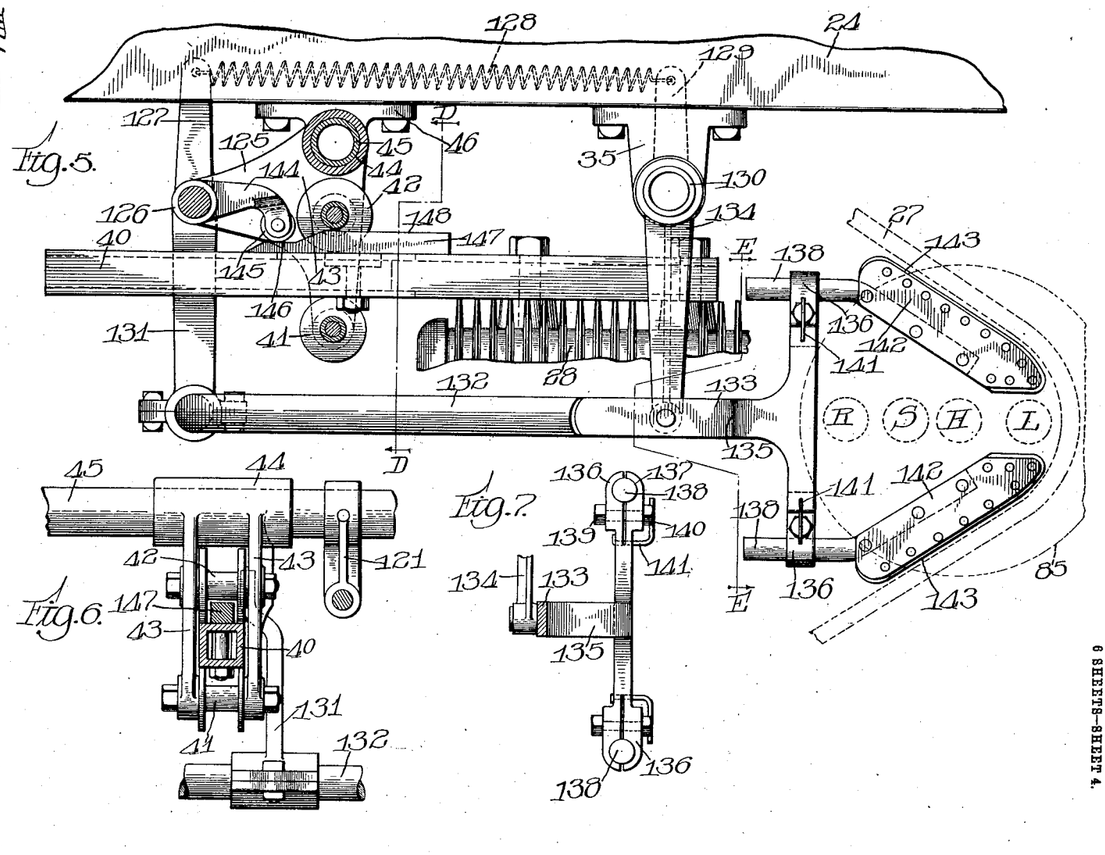
Fig. 5 is a detail on an enlarged scale, substantially on the line C—C of Fig. 2.
Figs. 6 and 7 are details in section, substantially on the line D—D and E—E, respectively, of Fig. 5.

The engine 28 may be of any suitable form, and I have, as a matter of convenience, illustrated a four-cycle engine having two opposed cylinders, and the driving shaft 29 connected directly with the pistons (preferably as shown in my application No. 470,376, filed Jan. 2, 1909), and having the fly wheels 30 rigidly secured thereon outside of the pair of mufflers 31, which may be connected to the engine and serve as bearings for the driving shaft 29 in the manner described in my aforesaid application No. 470,376, filed January 2, 1909. The engine is suspended to move forward and backward away from and toward the traction wheels 20, and, as a preferred means of suspending the same, I have illustrated the disks 32 journaled in the ears 33 secured to the mufflers, said disks running on the rods 34 supported by the pair of depending brackets 35 and 36 supported from the bottom of the box, preferably by being connected to the side bars 22 and 23. The brackets 36 may be connected to the rear axle by the distance rods 37, and to the forward portion of the body by the brace rods 38, and the brackets 35 may be braced from the rear end of the box by the truss rods 39. The rear end of the engine 28 has rigidly secured thereon the bar 40, which is preferably hollow and square in cross section, and which, as best seen in Figs. 5 and 6, slides back and forth between the pair of rollers 41 and 42, which are suitably journaled in the arms 43 depending from the sleeve 44 which is rigidly secured on the rod or tube 45 extending transversely of the machine and rigidly supported by the brackets 46 secured to its ends and depending from the under side of the side bars 22 and 23.

Figure 1:
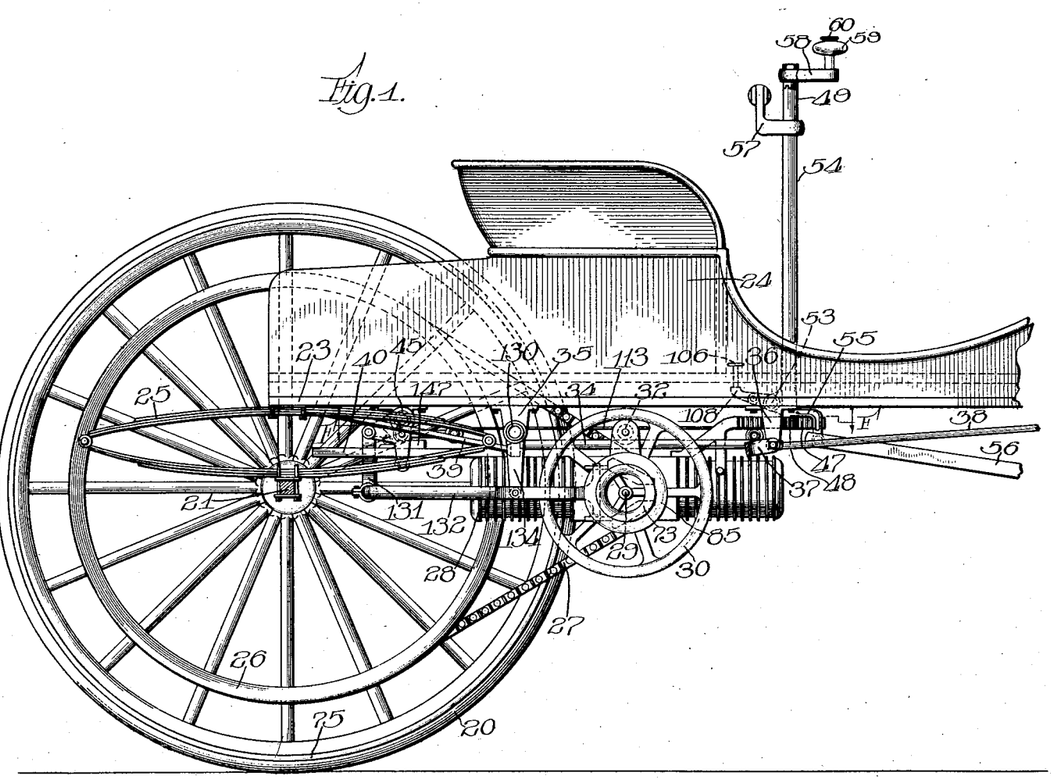
Figure 1 is a side elevation of the rear portion of an automobile to which my driving mechanism has been applied, and with the near hind wheel omitted.
Figures 10, 11, 12:
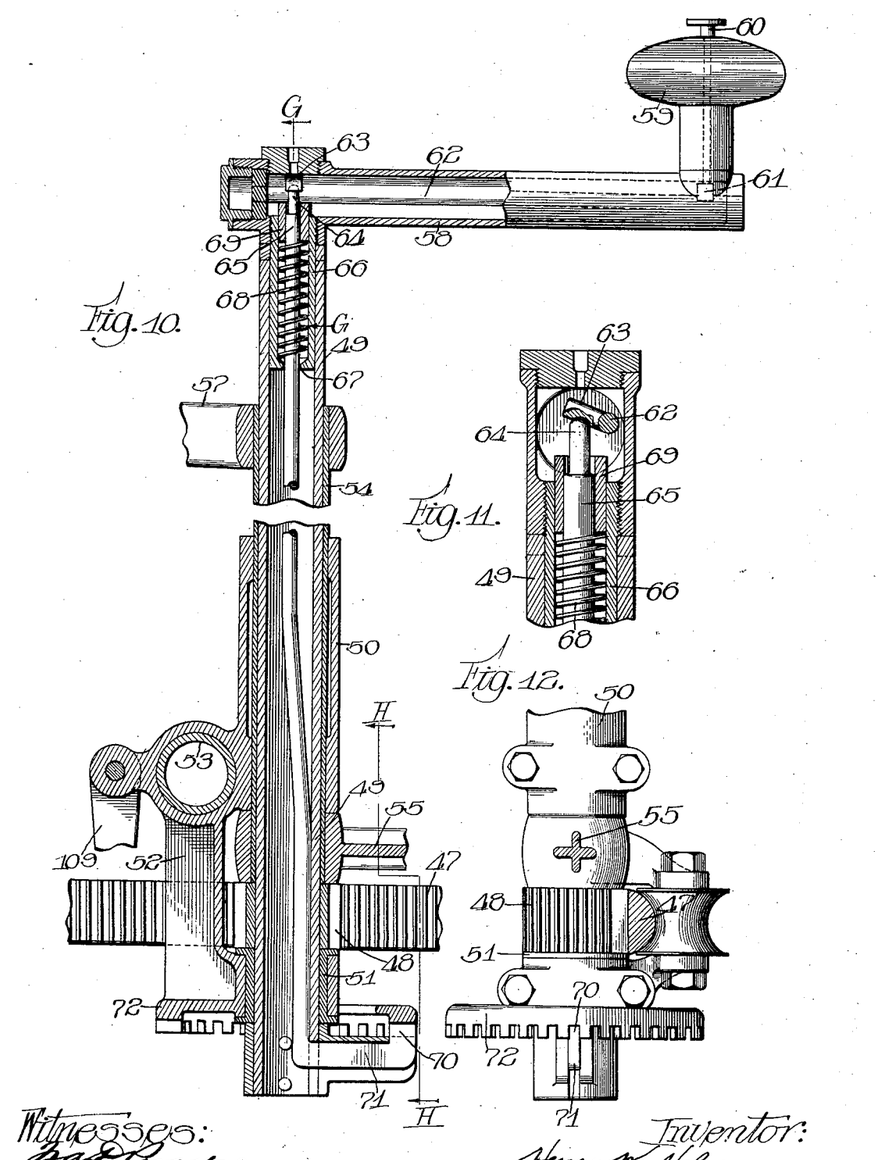
Fig. 10 is a vertical section through the steering and controlling shaft.
Fig. 11 is an enlarged detail on the line G—G of Fig. 10.
Fig. 12 is a detail in section on the line H—H of Fig. 10.

From the foregoing description, it will be seen that the engine is suspended by means of three roller bearings, and to move the same backward and forward as is necessary in the operation of the machine, I provide the rack bar 47, which is secured to its forward end, and, as best seen in Figs. 10 and 12, meshes with a pinion 48 which is rigidly secured on a tube 49, which is journaled in the elongated upper bearing 50 and the shorter, lower bearing 51, both of which bearings form a part of the bracket 52 which is rigidly secured on the rod or tube 53, which is supported at its outer ends in the depending brackets 36. I preferably employ in connection with this engine adjusting tube 49, the tube 54, which surrounds it for the greater portion of its length, but which terminates just above the pinion 48 and has secured thereto the arm 55, to which is connected the link 56, which extends forward to the steering knuckles, which are connected with and operate the front wheels in the customary manner. At the upper end of this sleeve 54 is secured the steering arm 57, which is located convenient to the driver's seat, and by which the direction of the vehicle may be controlled in the well known manner. The tube 49 has fastened to its upper end the horizontal arm 58, which preferably terminates in the handle 59, which is grasped by the hand of the driver to swing the tube 49, and thereby control the position of the engine. To enable me to adjust the angle of the arm 58 relative to the tube 49, I preferably make the connections between the two elements by means of a series of equidistant squared notches of the same size, as seen in Fig. 1, but not lettered, formed in the top of the tube 49 and in a short tubular offset of the arm 58. As it is important to lock the engine in any desired position, I employ a headed pin 60 projecting above the handle 59, with its lower end resting on an arm 61 of a rock shaft 62 which is journaled eccentrically within bearings formed in disks at the ends of the hollow arm 58, and has at its inner end an arm 63 like the arm 61, and resting upon the reduced upper end 64 of a plunger 65, which is adapted to slide in the bearing sleeve 66 secured in the upper end of the tube 49 and having the reduced bore at 67. A helically-coiled expanding-spring 68 is interposed between the bottom of the sleeve 66 and the collar 69 secured near the upper end of the plunger, so that the plunger is always held in its uppermost position with the upturned lower end 70 thereof, which is carried by the horizontal arm 71, engaging some one of the recesses of the toothed disk 72 which forms the lower portion of the bracket 52, and is concentric with the sleeves. It will be apparent that if the pin 60 is pressed down, the plunger 65 will be depressed to release its end 70 from the toothed segment, so that the tube 49 can be swung to any desired position to move the engine back and forth, and when the pressure on the pin 60 is released, the spring 68 will throw the plunger up to lock the sleeve 49 in the chosen position of adjustment.

Figures 3, 4:
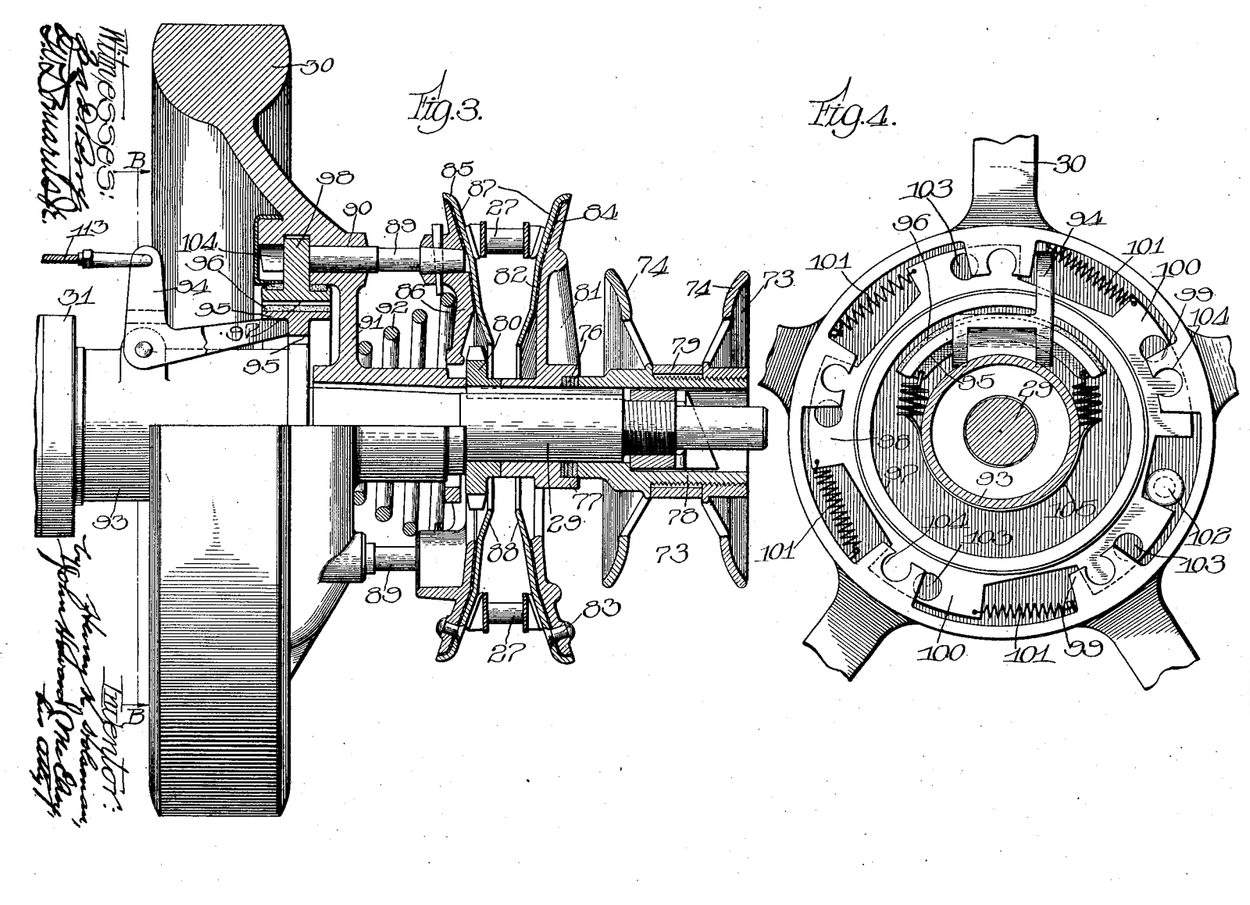
Fig. 3 is an enlarged detail in section on the line A—A of Fig. 2.
Fig. 4 is another detail in section on the line B—B of Fig. 3.

Referring now to Figs. 2 and 3, it will be seen that the outer ends of the shaft 29 have secured thereon the reverse disks 73, which, generally speaking, are of the character shown in my Patent No. 878,955, dated February 11, 1908, and have their diverging friction surfaces 74 adapted to coöperate with the rim 75 of the traction wheels 20 to drive the machine backward when the engine is moved to its rearmost position. I preferably secure these reverse disks adjustably on the shaft 29 by interposing a series of washers 76 between the inner ends of the hubs of said disks and the outer ends of the hubs 77 of the driving sheaves. By varying the numbers or thicknesses of washers 76 employed, I am enabled to aline the reverse disks accurately with the traction wheels 20 in spite of any variation that may be met with in the manufacture. I preferably also make the distance between the friction surfaces 74 of the reverse disks 73 adjustable by the construction shown in Fig. 3, where it will be seen that the hub of the inner half of the disk has a threaded extension 78, upon which is threaded the outer half of the disk, and the two halves are spaced apart the necessary distance to give the desired space between the two friction surfaces 74 by means of a ring 79, which may be of any necessary width to secure the desired distance between the friction surfaces.

The driving sheave may be considered as made up of three principal parts, the outer relatively stationary disk, the inner movable disk, and the intermediate sprocket pinion 80, which is splined on the shaft 29, and is immovable thereon. The outer disk has the cast metal body portion 81 and the hardened spring steel bearing portion 82, which is a disk of annular shape riveted to the casting 81, as seen at 83, and to prevent rattling, I preferably interpose the annular layer 84 of some suitable fibrous material, such as cloth, a construction which I have found by practice serves to deaden the sound which might otherwise result from the chain contacting with the steel surface. This bearing disk 82, and the similar disk 85, which is carried by the movable casting 86, have the inclined friction surfaces 87, which have the proper divergence to engage the friction surfaces on the sides of the chain 27. They also have on their inner edges the diverging surfaces 88, which serve to force the chain outward when it is released from the sprocket 80 in the manner to be described. The casting 86 has secured therein a plurality of horizontally extending pins 89, and I have shown five such pins, although it will be understood that any other desired number may be employed. These pins are adapted to slide in the bearings 90 formed in the hub 91 of the fly wheel 30, and normally stand in the outermost position shown in full lines in Fig. 3, the casting 86 being forced into this position by the helically and conically coiled spring 92 interposed between the hub 91 and the casting 86. The shaft 29 rotates in the bearings 93 secured on the outer ends of the mufflers 31, and fulcrumed on these bearings 93 are the bell crank levers 94, the horizontal arms of which engage or are formed rigidly with the under side of the brake segment 95, which carries the brake surface 96, which may have a covering of leather or some other suitable material, and which is adapted to engage the annular inner surface 97 of the annulus 98, which is supported in the channel formed in the hub 91 of the fly wheel 30. The outer sides of this channel are interrupted, being formed of the projections 99 extending inward radially from the hub, and the annulus 98 has the corresponding number of outwardly extending projections 100, which when the parts are assembled are always in register with the projections 99, so that the annulus 98 is held in place. A series of helically-coiled contractile-springs 101 is interposed between the projections 100 and the projections 99, so as to pull the annulus 98 against the pin 102 secured to the hub 91 after the parts are assembled. The projections 100 have apertures 103 therein of the proper size to receive the pins 89, and the projections 99 likewise have corresponding recesses 104. The brake 95 is normally held out of engagement with the surface 97 on the annulus 98 by the spring 105, which may be of the construction shown, consisting of the two helically-coiled contractile portions at the ends connected to the brake and having the intermediate portion surrounding the bearing 93. When the machine is running on the high speed, the ends of the pins 89 are forced against the outer faces of the projections 100, so that the inner disk presents an unyielding surface to the pressure of the chain 27, and the chain cannot approach the center of the sheave, and must drive the machine at the high speed. When it is desired to drive the machine at the low speed, the pedal 106 located in the body adjacent the seat is depressed by the driver's foot, and by the connections to be described, the bell crank levers 94 on both sides of the machine are rocked to bring the brake 95 into engagement with the surface 97 on the annulus 98. This temporarily stops the movement of the disk 98 forward with the fly wheel 30, and the apertures 103 are brought in register with the apertures 104, so that as the engine is moved forward by the operation of the handle 59, the chain 27 can force the inner disk 85 inward, thus separating the two disks until the chain engages with the sprocket wheel 80, and the machine will then be driven forward at low speed by a positive chain drive from the shaft 29. When the machine is to be run at high speed, it is only necessary to move the motor rearward, when the centrifugal force will cause the chain 27 to leave the sprocket 80, and the surfaces 88 will further assist in throwing the chain out until it reaches the high-speed position under the stress of the spring 92. The disk 98 is then drawn to the normal position shown in Fig. 4 by the contraction of the springs 101, and the machine is ready to run at high speed again. If the machine is to be stopped, the engine is moved still farther back, when the chain 27 will be carried out of engagement with the driving sheave entirely by the means to be described, and the vehicle will come to rest. If the machine is to be reversed, the engine is moved still farther back until the reverse disks 73 have their friction surfaces brought into engagement with the rims 75 of the rear wheels, which engagement will drive the vehicle backward at a low rate of speed.

Figure 8:
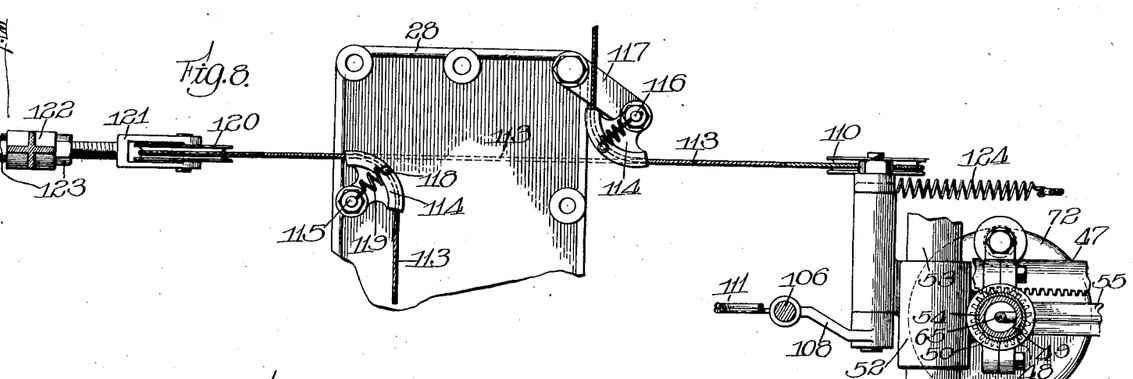
Fig. 8 is a detail of a portion of the connections for controlling the driving mechanism, substantially on the line F—F of Fig. 1.
Figure 9:
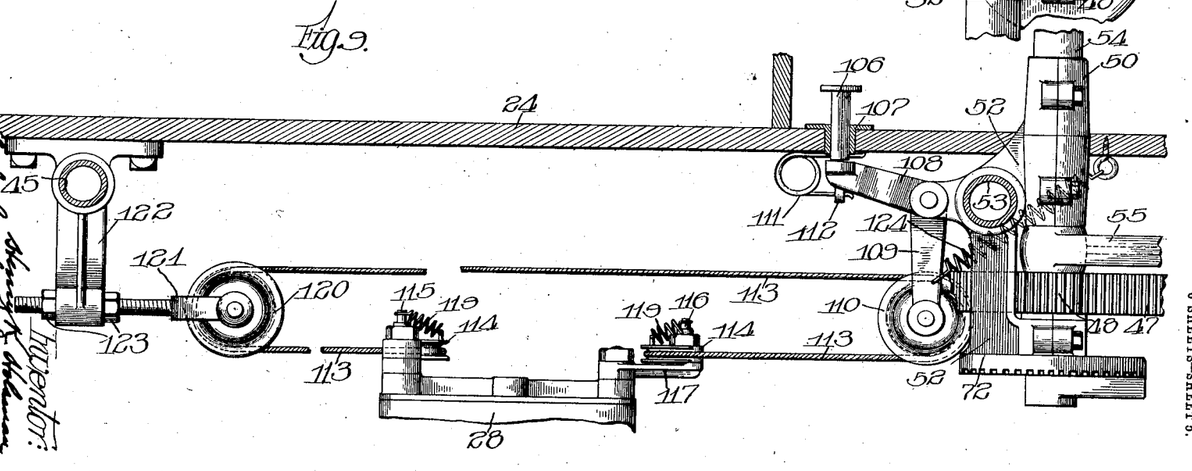
Fig. 9 is a side elevation of the details shown in Fig. 8.

I have mentioned the fact that the pressure of the pedal 106 causes the bell cranks 94 to be rocked, and the mechanism by which this is caused is best illustrated in Figs. 8 and 9, where it will be seen that the pedal 106 is mounted to slide in a sleeve 107 in the bottom of the wagon box, and is held in engagement with the arm 108 of a bell crank lever pivoted in the bracket 52, the other arm 109 of which carries the sheave 110. A coiled spring 111 has one end engaging the pedal 106 and the other end a lug 112 on the under side of the arm 108, so as to hold the two members in constant engagement and prevent the pedal being misplaced, and also to keep it from rattling. A cable 113 has its ends attached to the bell cranks 94, as seen in Fig. 3, and it then passes over a pair of segments 114 pivoted at 115 on the top of the engine, and at 116 to an arm 117 projecting from the top of the engine. A pin 118 is passed through the outer edges of these sheave segments to hold the cable on the segments, and the contractile springs 119 extend from the pins to the pivots to hold the pins in place. The cable 113 extends from the forward segment 114 around and over the sheave 110, and thence around a companion sheave 120 which is carried by a yoke 121, which has its end threaded through the bracket 122 depending from the bottom of the wagon box and constituting a part of the support for the sleeve 45. The jam nuts 123 serve to hold this sheave 120 in any desired position of adjustment. It will be apparent that as the engine is moved backward and forward, the cable 113 runs over the sheaves 110 and 120, so that the cable remains taut in all positions of the engine, the helically-coiled contractile-spring 124 being secured at one end to the arm 109 and at the other end to the bed, in order to take up the slack in the cable. When the pedal 106 is depressed, the sheave 110 is necessarily moved forward, thereby shortening the effective length of the cable 113 so that the two bell cranks 94 are rocked in the manner described.

I have previously referred to the fact that means is provided for holding the chain 27 out of engagement with the driving sheave when the vehicle is stopped and while it is being reversed, and the mechanism for this purpose is shown in Figs. 1, 2, and 5 to 7. As best shown in Fig. 5, the bracket 43 is provided with arms 125, between which is pivoted a three-armed lever 126, the upper arm 127 of which is connected by the helically-coiled contractile-spring 128 with an arm 129 which is shown as projecting up from the rock shaft 130, which rock shaft may carry the brakes (not shown) which engage with the sheaves 26 on the driven wheel, so that with this arrangement the spring 128 serves to swing the lower arm 131 rearward and also the brakes out of engagement with the sheaves so that they will be held out of engagement until they are positively thrown into engagement by some suitable means, such as a foot pedal, not shown. The arm 131 has journaled in the bottom thereof the rod 132, which is shaped as shown in Fig. 2, and has at its inner ends the T-shaped members 133 which are suspended by means of links 134 depending from the shaft 130, which is suspended from the brackets 35. The arms 133 have offsets 135 to bring the clamping ends 136 into the plane of the driving sheaves, as seen. These clamping ends are split, and have circular recesses 137 in which are secured the shanks 138 of the adjustable supporting arms, which are secured in any desired position of adjustment by means of bolts 139 and nuts 140, which may be locked in position by springs 141. These supports have their inner ends converging as seen in Fig. 5, and carry clamping bars 142 which are riveted thereto, and which in turn have riveted between them the supporting members 143, which are preferably made of rawhide or some similar material and have their inner ends rounded off as shown, so that when the chain 27 is supported thereon and runs thereover while the vehicle is being backed, the chain will not be forced into any position in which it might bind. The three-armed lever 126 is provided with the third arm 144, which has a yoke on its inner end in which is journaled the anti-friction roller 145, which coöperates either with the top of the bar 40, if the engine is on its high speed, or with the surface 146 of the cam member 147, if the machine is on its low speed, or with the surface 148 on the cam member if the machine is at rest or being reversed. The position of the driving shaft of the machine in the four different positions of adjustment is indicated by the four dotted circles in Fig. 5, the circle R representing its position on reverse, the circle S when the machine is stopped, the circle H its position when the machine is on high speed, and the circle L its position when the machine is on low speed. The supporting fork for the chain will of course occupy one position when the machine is running on high speed, and in that position the fork is out of engagement with the chain. It occupies another position farther forward when the engine is running at low speed, and it occupies still another position still farther forward when the machine is at rest or is running on the reverse, and in the last two positions the chain is supported by the forks.

From the foregoing description, the construction and mode of operation of my novel driving mechanism will be readily apparent, and it will be understood that while it is designed primarily for automobiles, and for a particular type of automobiles, it may be used for any other purposes and with any type of automobile for which it may be adapted.

From the foregoing description of the elements, their functions, and modes of operation, it will be seen that the disks 82 and 85 are chain-engaging devices arranged to rotate with the sprocket wheel 80 and capable of forcing the chain 27 outwardly from engagement with the sprocket wheel while maintaining driving engagement with the chain through the medium of the surfaces 88, and it will be further noted that this device is arranged to operate automatically in forcing the chain outwardly from engagement with the sprocket wheel. It will further be noticed that the operating handle 59 and its connections with the driving shaft 29, so that the forward movement of the latter compels the sprocket chain 27 to come into mesh with the sprocket pinion, constitutes means for positively forcing the sprocket chain 27 into engagement with the sprocket wheel 80. The above connections being so constructed as to prevent the movement of the chain 27 outward farther than the friction drive surface 87 may be said to constitute means for limiting the movement of the sprocket chain 27 away from the sprocket wheel 80. It will also be noted that the chain 27 is a flexible power transmitter passed around the sheave 26 which constitutes a rotatable driven means, and that the two driving disks 82 and 85 constitute a driving means comprising two adjacent sides positioned to admit the flexible power transmitter between them, and that one of said sides (the disk 85) is adjustable relative to the other, and that during the drive on low speed, which may be the normal speed under some conditions of operation, said sides are normally separated far enough to avoid driving engagement with the flexible power transmitter, which then engages the sprocket wheel, and that the apparatus is provided with means for forcing the chain or flexible power transmitter toward the center of said sides. It will further be noted that the periphery of the sprocket wheel 80 may be called a rim rotatably mounted between the two adjacent sides (the driving disks) to engage the flexible power transmitter (the chain) when at its limit of movement toward the center of said sides. It will also be noted that the springs 92 constitute yielding means tending to bring the driving disks together during their operation, and that said disks have in the surfaces 88 diverging surfaces adjacent the sprocket wheel to carry the chain out of engagement therewith.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a driving mechanism, the combination with a driven member having a friction sheave, of a driving member having friction surfaces for one speed and sprocket teeth for another speed, and a sprocket chain adapted to connect said sheave and friction surfaces at one speed, and said sheave and sprocket teeth at another speed, and to be disengaged from either the friction surfaces or the sprocket teeth of the driving member when it is desired to stop the driven member.

2. In a driving mechanism, the combination with a driven member having a friction sheave, of a driving member having sprocket teeth for low speed and friction surfaces for high speed, said surfaces being separable to permit the chain to engage the teeth, a sprocket chain adapted to connect said sheave and friction surfaces for high speed and said sheave and sprocket teeth for low speed, and means for moving the chain and the driving member relatively to engage the chain with the friction surfaces or the teeth or to disengage it from both.

3. In a driving mechanism, the combination with a driven member having a friction sheave and annular friction surfaces, of a driving member having diverging friction surfaces for engaging with the annular surfaces on the driven member for reverse, friction surfaces for a high speed forward, and sprocket teeth for a low speed forward, and a sprocket chain adapted to connect said sheave and the high-speed friction surfaces, or said sheave and the sprocket teeth, or to be disengaged from both to stop the mechanism or permit it to be reversed.

4. In a driving mechanism, the combination with a driven member having a friction sheave and annular friction surfaces, of a driving member having diverging friction surfaces for engaging with the annular surfaces on the driven member for reverse, friction surfaces for a high speed forward, and sprocket teeth for a low speed forward, a sprocket chain adapted to connect said sheave and the high-speed friction surfaces, or said sheave and the sprocket teeth, or to be disengaged from both to stop the mechanism or permit it to be reversed, and means for moving the chain and the driving member relatively to engage the chain with the friction surfaces or the teeth.

5. In a driving mechanism, the combination with a driven member having a friction sheave and annular friction surfaces, of a driving member having diverging friction surfaces for engaging with the annular surfaces on the driven member for reverse, friction surfaces for a high speed forward, and sprocket teeth for a low speed forward, a sprocket chain adapted to connect said sheave and the high-speed friction surfaces, or said sheave and the sprocket teeth, or to be disengaged from both to stop the mechanism or permit it to be reversed, and means for moving the chain and the driving member relatively to engage the chain with the friction surfaces or the teeth, or to disengage it from both.

6. In a driving mechanism, the combination with a driven member having a friction sheave and annular friction surfaces, of a driving member having diverging friction surfaces for engaging with the annular surfaces on the driven member for reverse, friction surfaces for a high speed forward, and sprocket teeth for a low speed forward, a sprocket chain adapted to connect said sheave and the high-speed friction surfaces, or said sheave and the sprocket teeth, or to be disengaged from both to stop the mechanism or permit it to be reversed, and means for moving the chain and the driving member relatively to engage the chain with the friction surfaces or the teeth, or to disengage it from both, and to engage the reverse friction driving surfaces with the reverse friction surfaces on the driven member.

7. In a driving mechanism, the combination with a driven member having a friction sheave, of a driving member having friction surfaces for high speed and sprocket teeth for low speed, a sprocket chain adapted to connect said sheave and friction surfaces for high speed, and said sheave and sprocket teeth for low speed, and means for moving the driving member to and from the driven member to engage the chain with the sprocket teeth or with the friction surfaces.

8. In a driving mechanism, the combination with a driven member having a friction sheave, of a driving member having friction surfaces for high speed and sprocket teeth for low speed, a sprocket chain adapted to connect said sheave and friction surfaces for high speed, and said sheave and sprocket teeth for low speed, and means for moving the driving member to and from the driven member to engage the chain with the sprocket teeth or with the friction surfaces, or to disengage it from both.

9. In a driving mechanism, the combination with a driven member having a friction sheave and reverse friction surfaces, of a driving member having reverse friction surfaces, other friction surfaces for high-speed forward, and sprocket teeth for low speed forward, a sprocket chain adapted to connect said sheave and friction surfaces for high speed forward, and said sheave and sprocket teeth for low speed forward, and means for moving the driving member to and from the driven member to engage the reverse friction surfaces, or to disengage said reverse friction surfaces and to engage the chain with either the high-speed friction surfaces or with the low-speed sprocket teeth.

10. In a driving mechanism, the combination with a driven member having a friction sheave and reverse friction surfaces, of a driving member having reverse friction surfaces, other friction surfaces for high speed forward, and sprocket teeth for low speed forward, a sprocket chain adapted to connect said sheave and friction surfaces for high speed forward, and said sheave and sprocket teeth for low speed forward, and means for moving the driving member to and from the driven member to engage the reverse friction surfaces, or to disengage said reverse friction surfaces and to engage the chain with either the high-speed friction surfaces or with the low-speed sprocket teeth, or to disengage all of said driving surfaces and bring the driven member to rest.

11. In a driving mechanism, the combination with a relatively stationary driving disk member, of a coöperating driving disk member movable to and from the first member, a driven member coöperating therewith and tending to separate the two disk members, locking mechanism normally preventing the relative movement of the movable disk member, a sheave engaged by said driven member, means to vary the effective distance between the axes of said disk members and sheave, and mechanism for instantly releasing the locking mechanism, said releasing mechanism being located at a distance from the driving disk members.

12. In a driving mechanism, the combination with a relatively stationary driving disk member, of a coöperating disk member movable to and from the first member, a spring pressing said members together, a driven member coöperating therewith and tending to separate the disk members, and locking mechanism acting automatically to secure said members and prevent their separation as soon as they have been brought together by the spring.

13. In a driving mechanism, the combination with a relatively stationary driving disk member, of a coöperating disk member movable to and from the first member, a spring pressing said members together, a driven member coöperating therewith and tending to separate the disk members, locking mechanism acting automatically to secure said members and prevent their separation as soon as they have been brought together by the spring, and means coöperating therewith to release the locking mechanism to permit their separation.

14. In a driving mechanism, the combination with a relatively stationary driving disk member, of a coöperating disk member movable to and from the first member, means for rotating said disk members, means for moving both of said disk members transversely of their axis, a driven member coöperating therewith and tending to separate the disk members, a spring pressing said members together, locking mechanism acting automatically to secure said members and prevent their separation as soon as they have been brought together by the spring, a support stationary relative to the disk members, a releasing member on said support, and connections between said releasing member and said locking mechanism operable in all positions of translation of the driving disk members.

15. In a driving mechanism, the combination with a relatively stationary driving disk member, of a coöperating disk member movable to and from the first member, a driven member coöperating therewith and tending to separate the disk members, a locking disk having recesses therein capable of a slight rotation relatively to the movable member, pins carried by the movable member normally out of register with the recesses, springs holding the locking disk against rotation, and means for moving the locking disk against the resistance of its springs until the pins register with the recesses.

16. In a driving mechanism, the combination with a relatively stationary driving disk member, of a coöperating disk member movable to and from the first member, a driven member coöperating therewith and tending to separate the disk members, a locking disk having recesses therein capable of a slight rotation relatively to the movable member, pins carried by the movable member normally out of register with the recesses, springs holding the locking disk against rotation, means for moving the locking disk against the resistance of its springs until the pins register with the recesses, and a spring pressing the movable disk member toward the relatively stationary one.

17. In a driving mechanism, the combination with a relatively stationary driving disk member, of a coöperating disk member movable to and from the first member, a driven member coöperating therewith and tending to separate the disk members, a locking disk having recesses therein capable of a slight rotation relatively to the movable member, pins carried by the movable member normally out of register with the recesses, springs holding the locking disk against rotation, and a brake for said locking disk to prevent its rotation with the movable disk until its pins register with the recesses in the locking disk.

18. In a driving mechanism, the combination with a relatively stationary driving disk member, of a coöperating disk member movable to and from the first member, a driven member coöperating therewith and tending to separate the disk members, a locking disk having recesses therein capable of a slight rotation relatively to the movable member, pins carried by the movable member normally out of register with the recesses, springs holding the locking disk against rotation, a brake for said locking disk to prevent its rotation with the movable disk until its pins register with the recesses in the locking disk, and means for operating said brake capable of being actuated in any position of the disks.

19. In a driving mechanism, the combination with a shaft having a sprocket wheel thereon, of a pair of friction disks supported on said shaft adjacent the sprocket wheel and movable relatively to and from each other, a sprocket chain adapted to coöperate either with the friction disks or with the sprocket wheel, and a spring tending to bring said disks together, said disks having two pairs of diverging surfaces, one toward their peripheries for driving friction engagement with the chain and the other at their inner edges for carrying the chain out of engagement with the sprocket wheel.

20. In a driving mechanism, the combination with a driven member having engaging means for an endless flexible connection, of a driving member adapted to be continuously rotated and movable to and from said driven member and having similar engaging means, an endless flexible connection for said members, and means for holding the flexible connection out of engagement with the engaging means of the driving member as the latter is moved toward the driven member.

21. In a driving mechanism, the combination with a driven member having engaging means for an endless flexible connection, of a driving member movable away from the driven member, adapted to be continuously rotated and having similar engaging means, an endless flexible connection for said members, and means for holding the flexible connection out of engagement with the engaging means of the driving member as the latter is moved toward the driven member.

22. In a driving mechanism, the combination with a driven member having engaging means for an endless flexible connection, of a driving member movable away from the driven member, adapted to be continuously rotated and having similar engaging means, an endless flexible connection for said members, and means acting automatically for holding the flexible connection out of engagement with the engaging means of the driving member as the latter is moved toward the driven member.

23. In a driving mechanism, the combination with a driven member having engaging means for an endless flexible connection and engaging means for a reverse disk, of a driving member adapted to be continuously rotated and movable to and from said driven member, and having similar engaging means and a reverse disk, an endless flexible connection for said members, and means for holding the flexible connection out of engagement with the engaging means of the driving member as the latter is moved toward the driven member to bring the reverse disk into engagement with its engaging means on the driven member.

24. In a driving mechanism, the combination with a driven member having engaging means for an endless flexible connection and engaging means for a reverse disk, of a driving member adapted to be continuously rotated and movable to and from said driven member, and having similar engaging means and a reverse disk, an endless flexible connection for said members, and means acting automatically for holding the flexible connection out of engagement with the engaging means of the driven member as the latter is moved toward the driven member to bring the reverse disk into engagement with its engaging means on the driven member.

25. In a driving mechanism, the combination with a driven member having engaging means for an endless flexible connection, of a driving member adapted to be continuously rotated and movable to and from said driven member, and having two separate engaging means for the flexible connection, an endless flexible connection for said members, and means for holding the flexible connection out of engagement with the engaging means of the driving member as the latter is moved toward the driven member.

26. In a driving mechanism, the combination with a driven member having engaging means for an endless flexible connection, of a driving member adapted to be continuously rotated and movable to and from said driven member, and having two separate engaging means for the flexible connection, an endless flexible connection for said members, and means acting automatically for holding the flexible connection out of engagement with the engaging means of the driving member as the latter is moved toward the driven member.

27. In a driving mechanism, the combination with a driven member having engaging means for an endless flexible connection and for a reverse disk, of a driving member adapted to be continuously rotated and movable to and from said driven member, and having two separate similar engaging means and a reverse disk, an endless flexible connection for said members, and means for holding the flexible connection out of engagement with the two similar engaging means of the driving member as the latter is moved toward the driven member to stop the driving mechanism or reverse it.

28. In a driving mechanism, the combination with a driven member having engaging means for an endless flexible connection and for a reverse disk, of a driving member adapted to be continuously rotated and movable to and from said driven member, and having two separate similar engaging means and a reverse disk, an endless flexible connection for said members, and means acting automatically for holding the flexible connection out of engagement with the two similar engaging means of the driving member as the latter is moved toward the driven member to stop the driven mechanism or reverse it.

29. In a driving mechanism, the combination with a driven member having a sheave, of a driving member adapted to be continuously rotated and movable to and from said driven member, and having a driving sheave and sprocket teeth, a friction sprocket chain for said members, and means for holding the chain out of engagement with the driving sheave and with the sprocket teeth as the driving member is moved toward the driven member.

30. In a driving mechanism, the combination with a driven member having a sheave and engaging surfaces for a reverse disk, of a driving member adapted to be continuously rotated and movable to and from said driven member, and having a reverse disk, a driving sheave and sprocket teeth, a friction sprocket chain adapted to engage the sheave on the driven member and the sheave or sprocket teeth on the driving member, and means for holding the chain out of engagement with the driving sheave or the sprocket teeth as the driving member is moved toward the driven member to bring the reverse disk into action.

31. In a driving mechanism, the combination with a driven member having a sheave and engaging surfaces for a reverse disk, of a driving member adapted to be continuously rotated and movable to and from said driven member, and having a reverse disk, a driving sheave, and sprocket teeth, a friction sprocket chain adapted to engage the sheave on the driven member and the sheave or sprocket teeth on the driving member, and means acting automatically for holding the chain out engagement with the driving sheave or the sprocket teeth as the driving member is moved toward the driven member to bring the reverse disk into action.

32. In a driving mechanism, the combination with a driven member having a sheave and engaging surfaces for a reverse disk, of a driving member adapted to be continuously rotated and movable to and from said driven member, and having a reverse disk, a driving sheave and sprocket teeth, a friction sprocket chain adapted to engage the sheave on the driven member and the sheave or sprocket teeth on the driving member, and means for holding the chain out of engagement with the driving sheave or the sprocket teeth as the driving member is moved toward the driven member to bring the reverse disk into action, consisting of a fork having converging bearing surfaces for the chain.

33. In a driving mechanism, the combination with a driven member having a sheave and engaging surfaces for a reverse disk, of a driving member adapted to be continuously rotated and movable to and from said driven member, and having a reverse disk, a driving sheave and sprocket teeth, a friction sprocket chain adapted to engage the sheave on the driven member and the sheave or sprocket teeth on the driving member, and means for holding the chain out of engagement with the driving sheave or the sprocket teeth as the driving member is moved toward the driven member to bring the reverse disk into action, consisting of a fork having converging bearing surfaces for the chain and movable longitudinally between the driven and driving members and adapted to engage the chain.

34. In a driving mechanism, the combination with a driven member having a sheave and engaging surfaces for a reverse disk, of a driving member adapted to be continuously rotated and movable to and from said driven member, and having a reverse disk, a driving sheave and sprocket teeth, a friction sprocket chain adapted to engage the sheave on the driven member and the sheave or sprocket teeth on the driving member, and means for holding the chain out of engagement with the driving sheave or the sprocket teeth as the driving member is moved toward the driven member to bring the reverse disk into action, consisting of a fork having converging bearing surfaces for the chain, and means for automatically moving the fork.

35. In a driving mechanism, the combination with a driven member having a sheave and engaging surfaces for a reverse disk, of a driving member adapted to be continuously rotated and movable to and from said driven member, and having a reverse disk, a driving sheave and sprocket teeth, a friction sprocket chain adapted to engage the sheave on the driven member and the sheave or sprocket teeth on the driving member, and means for holding the chain out of engagement with the driving sheave or the sprocket teeth as the driving member is moved toward the driven member to bring the reverse disk into action, consisting of a fork having converging bearing surfaces for the chain, and means for automatically moving the fork, consisting of a cam member movable with the driving member and engaging an element moving with the fork.

36. In a driving mechanism, the combination with a driven member having a sheave and engaging surfaces for a reverse disk, of a driving member adapted to be continuously rotated and movable to and from said driven member, and having a reverse disk, a driving sheave, and sprocket teeth, a friction sprocket chain adapted to engage the sheave on the driven member and the sheave or sprocket teeth on the driving member, and means for holding the chain out of engagement with the driving sheave or the sprocket teeth as the driving member is moved toward the driven member to bring the reverse disk into action, consisting of a fork having converging bearing surfaces for the chain, and means for automatically moving the fork, consisting of a cam member movable with the driving member and having two surfaces engaging an element moving with the fork, one of said surfaces acting when the driven member is at rest and the other when it is in motion.

37. In a driving mechanism, the combination with a driven member having a sheave and engaging surfaces for a reverse disk, of a driving member adapted to be continuously rotated and movable to and from said driven member, and having a reverse disk, a driving sheave, and sprocket teeth, a friction sprocket chain adapted to engage the sheave on the driven member and the sheave or sprocket teeth on the driving member, means for holding the chain out of engagement with the driving sheave or the sprocket teeth as the driving member is moved toward the driven member to bring the reverse disk into action, consisting of a fork having converging bearing surfaces for the chain, means for automatically moving the fork, consisting of a cam member movable with the driving member and engaging an element moving with the fork, and a spring for automatically moving the fork back as the driving member is moved away from the driven member.

38. In a driving mechanism, the combination with a driven member having engaging means for an endless flexible connection, of a driving member adapted to be continuously rotated and movable to and from said driven member, and having similar engaging means, an endless flexible connection for said members, and a fork having converging bearing surfaces for the endless flexible connection adapted to be moved into position for holding said connection out of engagement with the engaging means of the driving member as the latter is moved toward the driven member.

39. In a driving mechanism, the combination with a driven member having engaging means for an endless flexible connection, of a driving member adapted to be continuously rotated and movable to and from said driven member, and having similar engaging means, an endless flexible connection for said members, and a fork having converging bearing surfaces for the endless flexible connection adapted to be moved automatically into position for holding said connection out of engagement with the engaging means of the driving member as the latter is moved toward the driven member.

40. In a driving mechanism, the combination with a driven member having engaging means for an endless flexible connection, of a driving member adapted to be continuously rotated and movable to and from said driven member, and having similar engaging means, an endless flexible connection for said members, a fork having converging bearing surfaces for the endless flexible connection adapted to be moved into position for holding said connection out of engagement with the engaging means of the driving member as the latter is moved toward the driven member, and means for adjusting the position of the converging bearing surfaces relative to the body of the fork.

41. In a driving mechanism, the combination with a driven member having engaging means for an endless flexible connection, of a driving member adapted to be continuously rotated and movable to and from said driven member, and having similar engaging means, an endless flexible connection for said members, and a fork having converging bearing surfaces for the endless flexible connection adapted to be moved into position for holding said connection out of engagement with the engaging means of the driving member as the latter is moved toward the driven member, said converging bearing surfaces being composed of suitably supported strips of rawhide.

42. In a driving mechanism, the combination with a frame, and a driven wheel journaled thereon, of a driving shaft, bearings for said driving shaft movable relative to said frame, driving connections between the shaft and the wheel, a controlling shaft, a gear thereon, a rack meshing with said gear and attached to the bearings of the driving shaft to control the operation of the driving connections, a handle extending from said shaft, a stationary ratchet segment, a plunger in said controlling shaft having a tooth coöperating with the segment, and connections between the handle and the plunger for operating the latter.

43. In a driving mechanism, the combination with a frame, and a driven wheel journaled thereon, of a driving shaft, bearings for said driving shaft movable relative to said frame, driving connections between the shaft and the wheel, a controlling shaft, a gear thereon, a rack meshing with said gear and attached to the bearings of the driving shaft to control the operation of the driving connections, a handle extending from said shaft, a stationary ratchet segment, a plunger in said controlling shaft having a tooth coöperating with the segment, and connections between the handle and the plunger for operating the latter, consisting of a rock shaft in the handle having two lugs, one engaging the end of the plunger, and a pin in the handle engaging the other lug.

44. In a driving mechanism, the combination with a frame, and a driven wheel journaled thereon, of a driving shaft, bearings for said driving shaft movable relative to said frame, driving connections between the shaft and the wheel, a controlling shaft, a gear thereon, a rack meshing with said gear and attached to the bearings of the driving shaft to control the operation of the driving connections, a handle extending from said shaft, a stationary ratchet segment, a plunger in said controlling shaft having a tooth coöperating with the segment, and connections between the handle and the plunger for operating the latter, consisting of a rock shaft in the handle having two lugs, one engaging the end of the plunger, a pin in the handle engaging the other lug, and a spring for holding the plunger elevated.

45. In a driving mechanism, the combination with a frame, of parallel rods suspended therefrom, an engine, supporting wheels for the engine running on the said rods, a bar attached to said engine parallel to the rods, a support suspended from the frame, and anti-friction wheels carried by said support and engaging said bar.

46. In a driving mechanism, the combination with a frame, of parallel rods suspended therefrom, an engine, supporting wheels for the engine running on the said rods, a bar attached to said engine parallel to the rods, a support suspended from the frame, anti-friction wheels carried by said support and engaging said bar, a rack bar attached to the opposite end of the engine from the aforesaid bar, a pinion meshing with the rack, and a controlling shaft carrying the pinion.

47. In a driving mechanism, the combination with a frame, and a pair of driven wheels mounted thereon, of an engine movable to and fro on said frame, connections from the engine to the wheels to drive the latter, members carried by the engine and movable to control said driving connections, a movable member mounted on the frame, and connections between said members acting in any position of the engine so that movement given to the member on the frame will be transmitted to the members on the engine, said connections consisting of a flexible member attached at its ends to the members on the engine and having a loop elongated as the member on the frame is moved.

48. In a driving mechanism, the combination with a frame, and a pair of driven wheels mounted thereon, of an engine movable to and fro on said frame, connections from the engine to the wheels to drive the latter, members carried by the engine and movable to control said driving connections, a movable member mounted on the frame, and connections between said members acting in any position of the engine so that movement given to the member on the frame will be transmitted to the members on the engine, said connections consisting of a flexible member attached at its ends to the members on the engine and having a loop elongated as the member on the frame is moved, and a bell-crank lever, one arm of which is engaged by the movable member on the frame, a sheave carried by the other arm over which the loop of the flexible member passes.

49. In a driving mechanism, the combination with a frame, and a pair of driven wheels mounted thereon, of an engine movable to and fro on said frame, connections from the engine to the wheels to drive the latter, members carried by the engine and movable to control said driving connections, a movable member mounted on the frame, and connections between said members acting in any position of the engine so that movement given to the member on the frame will be transmitted to the members on the engine, said connections consisting of a flexible member attached at its ends to the members on the engine and having a loop elongated as the member on the frame is moved, a bell-crank lever, one arm of which is engaged by the movable member on the frame, a sheave carried by the other arm over which the loop of the flexible member passes, and a second sheave opposed to the one carried by the bell-crank over which the flexible member runs.

50. In a driving mechanism, the combination with a frame, and a pair of driven wheels mounted thereon, of an engine movable to and fro on said frame, connections from the engine to the wheels to drive the latter, members carried by the engine and movable to control said driving connections, a movable member mounted on the frame, connections between said members acting in any position of the engine so that movement given to the member on the frame will be transmitted to the members on the engine, said connections consisting of a flexible member attached at its ends to the members on the engine and having a loop elongated as the member on the frame is moved, a bell-crank one arm of which is moved by the member mounted on the frame, a sheave carried by the other arm over which the elongated loop runs, an opposed stationary sheave carried by the frame over which the flexible member runs, and rotating guides over which the ends of the flexible member run, which ends extend at right angles to the general direction of the loop.

51. In a driving mechanism, the combination with a frame, and a pair of driving wheels mounted thereon, of an engine movable to and fro on said frame, connections from the engine to the wheels to drive the latter, members carried by the engine and movable to control said driving connections, a movable member mounted on the frame, connections between said members acting in any position of the engine so that movement given to the member on the frame will be transmitted to the members on the engine, said connections consisting of a flexible member attached at its ends to the members on the engine, and having a loop elongated as the member on the frame is moved, a bell-crank one arm of which is moved by the member mounted on the frame, a sheave carried by the other arm over which the elongated loop runs, an opposed sheave adjustably mounted on the frame over which the flexible member runs, and rotating guides over which the ends of the flexible member run, which ends extend at right angles to the general direction of the loop.

52. In a driving mechanism, the combination with a frame, and a pair of driven wheels mounted thereon, of an engine movable to and fro on said frame, connections from the engine to the wheels to drive the latter, members carried by the engine and movable to control said driving connections, a push pin carried by the frame, a bell-crank lever carried by said frame, one arm of which is engaged by the push pin, a sheave carried by the other arm of said bell-crank lever, an opposed sheave carried by the frame, and a flexible member attached at its ends to the members on the engine, and having a loop running over said sheave and elongated as the push pin is moved.

53. In a driving mechanism, the combination with a frame, and a pair of driven wheels mounted thereon, of an engine movable to and fro on said frame, connections from the engine to the wheels to drive the latter, members carried by the engine and movable to control said driving connections, a push pin carried by the frame, a bell-crank lever carried by said frame, one arm of which is engaged by the push pin, a sheave carried by the other arm of said bell-crank lever, an opposed sheave carried by the frame, a flexible member attached at its ends to the members on the engine and having a loop running over said sheaves and elongated as the push pin is moved, and a spring holding the push-pin and bell-crank in engaging position.

54. In a driving mechanism, the combination with a frame, and a pair of driven wheels mounted thereon, of an engine movable to and fro on said frame, connections from the engine to the wheels to drive the latter, members carried by the engine and movable to control said driving connections, a push pin carried by the frame, a bell-crank lever carried by the frame, one arm of which is engaged by the push pin, a sheave carried by the other arm of said bell-crank lever, an opposed sheave carried by the frame, a flexible member attached at its ends to the members on the engine and having a loop running over said sheaves and elongated as the push pin is moved, and a spring connected with the bell-crank to hold the flexible member taut.

55. In a driving mechanism, the combination with a frame, and a pair of driven wheels mounted thereon, of an engine movable to and fro on said frame, connections from the engine to the wheels to drive the latter, members carried by the engine and movable to control said driving connections, a push pin carried by the frame, a bell-crank lever carried by the frame, one arm of which is engaged by the push pin, a sheave carried by the other arm of said bell-crank lever, an opposed sheave carried by the frame, a flexible member attached at its ends to the members on the engine and having a loop running over said sheaves and elongated as the push pin is moved, a spring connected with the bell-crank to hold the flexible member taut, and another spring holding the push pin and bell crank in engagement.

In witness whereof, I have hereunto set my hand and affixed my seal, this 5th day of February, A. D. 1909.

HENRY K. HOLSMAN. [L. S.]

Witnesses:
C. BEN SHOLES,
JOHN HOWARD MCELROY.

Copies of this patent may be obtained for five cents each, by addressing the "Commissioner of Patents, Washington, D. C."